United States Patent [19]
Chliwnyj et al.

[11] Patent Number: 6,067,211
[45] Date of Patent: May 23, 2000

[54] OSCILLATING MAGNETIC HEAD AND STATIONARY BRUSH CLEANING APPARATUS

[75] Inventors: Alex Chliwnyj; John Raymond Haider; James Charles Simkins; Loyal Keith Whitted, all of Tucson; Will Allen Wright, Oro Valley, all of Ariz.

[73] Assignee: International Business Machines Corporation, Armonk, N.Y.

[21] Appl. No.: 08/627,869

[22] Filed: Apr. 3, 1996

[51] Int. Cl.$^7$ ........................................................ G11B 5/10
[52] U.S. Cl. ................................................................ 360/128
[58] Field of Search ..................................... 360/128, 122; 15/DIG. 12, DIG. 13, 100, 256.5, 256.53; 242/332.7, 332.4

[56] References Cited

U.S. PATENT DOCUMENTS

| | | | |
|---|---|---|---|
| 3,636,276 | 1/1972 | Rose | 360/93 |
| 3,881,195 | 4/1975 | Ono et al. | 360/128 |
| 3,964,104 | 6/1976 | Herron et al. | 360/128 |
| 4,165,526 | 8/1979 | Jones | 360/137 |
| 4,334,656 | 6/1982 | Crawford et al. | 242/332.4 |
| 4,510,541 | 4/1985 | Sasamoto | 360/128 |
| 4,704,647 | 11/1987 | Hino | 360/128 |
| 4,742,407 | 5/1988 | Smith et al. | 360/95 |
| 4,953,044 | 8/1990 | Van Pelt et al. | 360/73.09 |
| 4,956,737 | 9/1990 | Brock | 360/122 |
| 5,034,838 | 7/1991 | Brock et al. | 360/122 |
| 5,182,691 | 1/1993 | Mimasu et al. | 360/128 |
| 5,219,129 | 6/1993 | Spicer et al. | 360/95 |
| 5,335,128 | 8/1994 | Morinaka | 360/128 |
| 5,377,052 | 12/1994 | Guzman et al. | 360/106 |
| 5,453,894 | 9/1995 | Kim et al. | 360/128 |

FOREIGN PATENT DOCUMENTS

| | | |
|---|---|---|
| 0 102 897 | 2/1987 | European Pat. Off. . |
| 0 452 135 | 10/1991 | European Pat. Off. . |
| 0 530 837 A1 | 3/1993 | European Pat. Off. . |
| 06131637 | 5/1994 | Japan . |
| 1780100 A1 | 12/1992 | U.S.S.R. . |

OTHER PUBLICATIONS

European Search Report for EP 97 30 1737

Primary Examiner—Stuart S. Levy
Assistant Examiner—David D. Davis
Attorney, Agent, or Firm—Gray Cary Ware Freidenrich

[57] ABSTRACT

The present invention provides a cleaning apparatus for cleaning the air bearing surface of a magnetic head of a tape drive by employing components of an actuator for oscillating the magnetic head against bristles of a brush assembly. Circuitry is provided which senses the appropriate time to commence the cleaning action and continues the cleaning action for an appropriate duration when the magnetic tape is off the magnetic head. The circuitry causes the actuator to move the magnetic head in oscillatory motion against stationary bristles of a brush assembly which are selectively brought into engagement with the magnetic head. The engagement and disengagement of the bristles with respect to the magnetic head are implemented by a lever arm which has camming surfaces which are engageable with a leader pin which moves a leader block and magnetic tape about a guide and across the magnetic head.

17 Claims, 17 Drawing Sheets

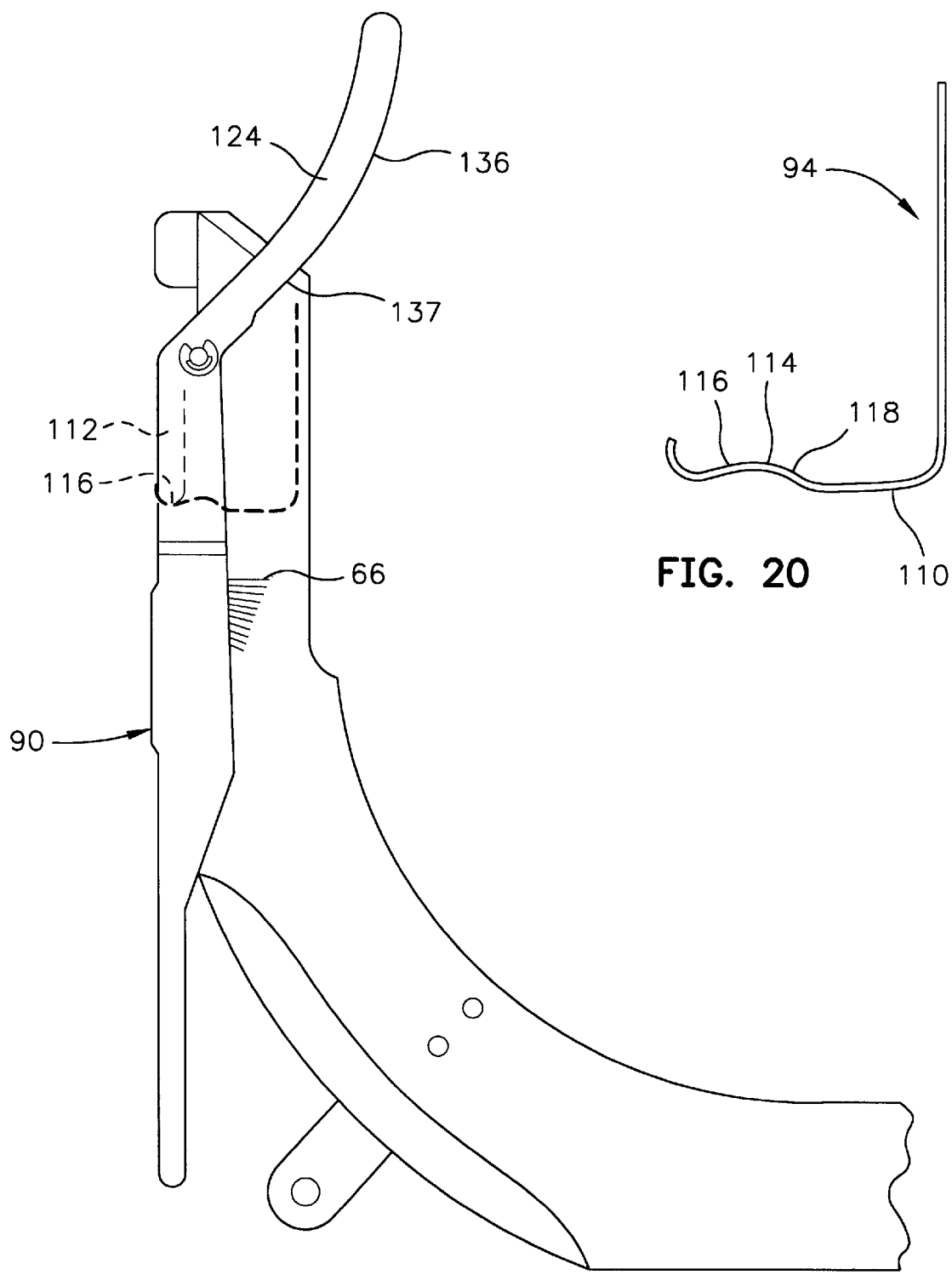

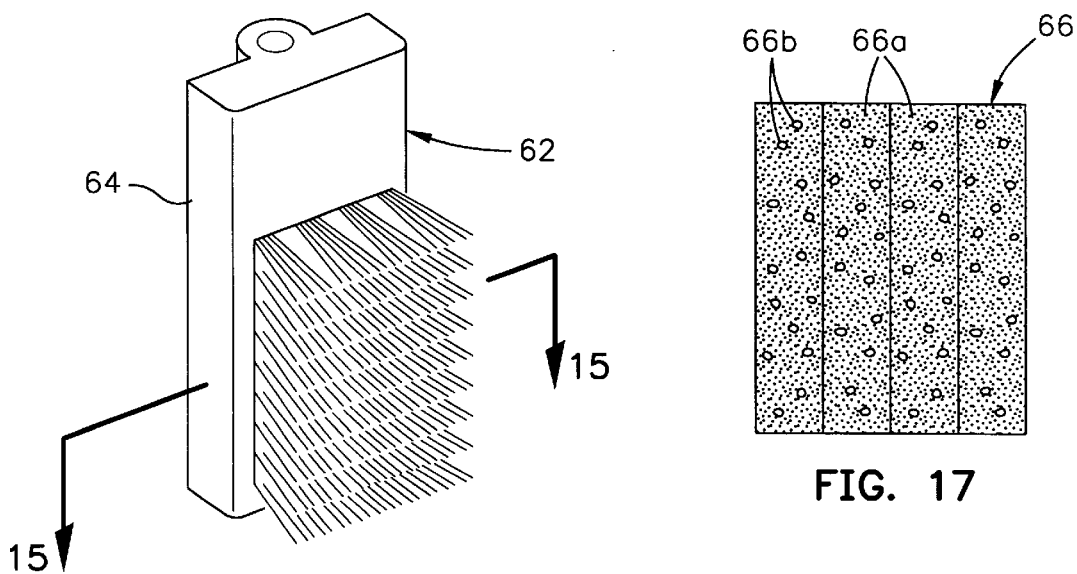
FIG. 14
FIG. 17
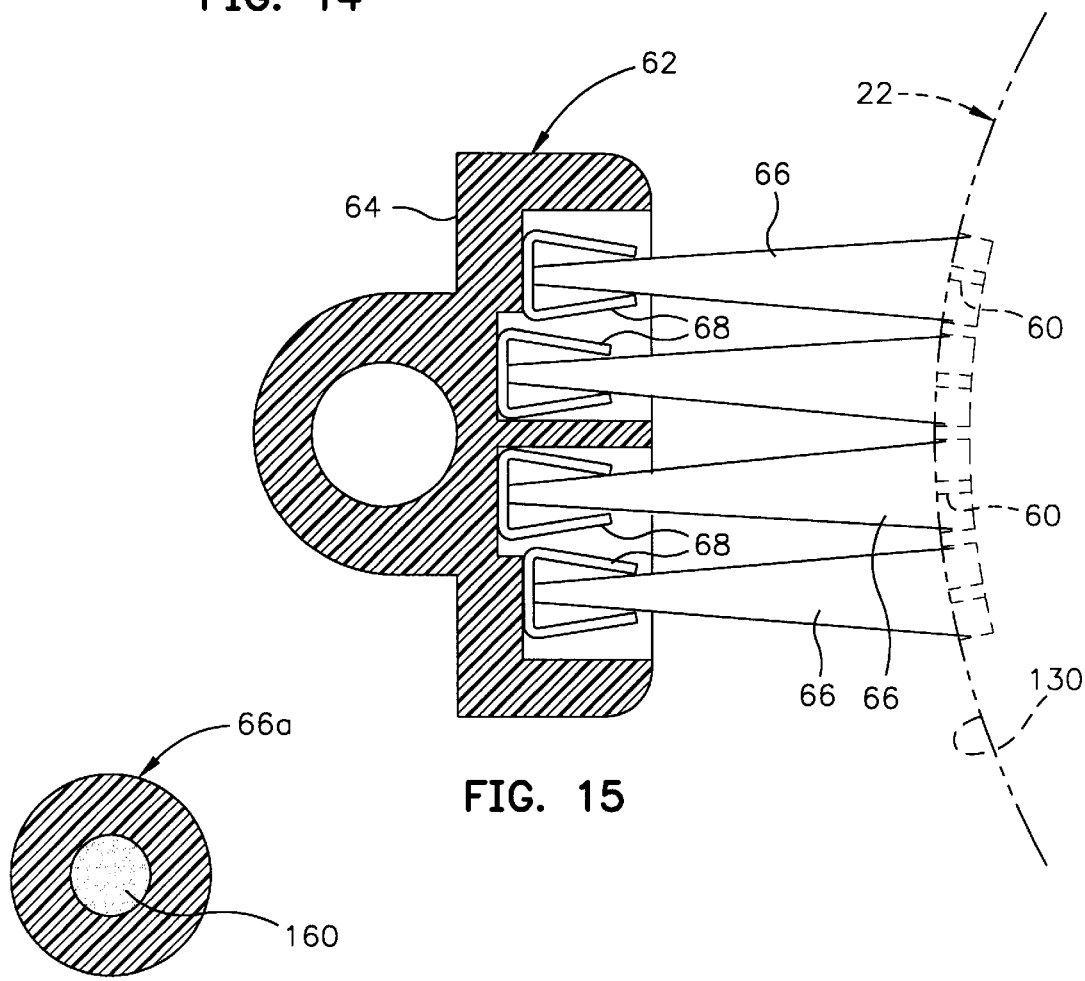
FIG. 16
FIG. 15

OSCILLATING MAGNETIC HEAD AND STATIONARY BRUSH CLEANING APPARATUS

BACKGROUND OF THE INVENTION

1. Field of the Invention

The present invention relates to an apparatus for cleaning a magnetic head of a tape drive, and more particularly to a magnetic head which oscillates within an available actuator movement against a stationary brush for cleaning an air bearing surface of the magnetic bead.

2. Discussion of the Related Art

A magnetic tape drive employs a drive assembly which moves a magnetic tape across the air bearing surface of a magnetic head assembly for performing recording, playback and servo operations. In a typical tape drive the movement of the tape develops an air cushion between the tape and an air bearing surface of the head assembly which causes the tape to be spaced from the air bearing surface a small distance, this distance being referred to as the "flying height". Some head assemblies are provided with cross slots which extend perpendicular to the path of the tape for bleeding some of the air and reducing the flying height. The reason for this is because the lower the flying height the greater the signal which allows greater recording densities. Lateral positioning of the magnetic tape relative to the head assembly is typically implemented by a tape guide on each side of the head assembly.

The head assembly is provided with at least one of each of a write head, read head and a servo head. The servo head cooperates with servo processing circuitry to position a write head and/or read head with respect to a track on the magnetic tape. After receiving servo information from a servo track, the servo processing circuitry sends signals to an actuator which supports the magnetic head assembly. The actuator then moves the head assembly perpendicular to the path of the tape so that accurate positioning of the head assembly relative to the desired data track is achieved. In some tape drives the range of perpendicular motion of the head assembly can be relatively large.

A serious problem in magnetic tape drives is the tape debris that is accumulated on the air bearing surface of the head assembly. Most of this debris is generated by friction between the top edge of the tape and the aforementioned tape guides. This tape debris rains down on the air bearing surface and can produce poor performance of the tape drive. If the debris adheres to a read or write head, permanent data errors can occur. Further, the debris can clog up the cross slots, causing improper bleeding of air at the air bearing surface and unintended alteration of the flying height. Sometimes the debris is released from the cross slots in large chunks, which can cause momentary signal drop outs and temporary data errors.

Another serious problem in magnetic tape drives results from electrostatic discharge (ESD). As the tape flies past the head assembly a charge is built up on the head assembly which, if too great, can result in permanent damage to the sensitive elements of the head assembly. Since the build up of the charge is cumulative, the more the tape drive is used, the greater the charge. If this charge can be relieved before reaching an unacceptably high level, the sensitive elements can be protected. ESD can occur during maintenance of the head assembly or when touched by an operator.

A typical, commercially available magnetic tape drive is the 3590 tape drive made by International Business Machines (IBM). This drive has the components mentioned hereinabove. The 3590 tape drive employs a pantocam arm which carries a leader pin for capturing a leader block, the leader block being attached to the magnetic tape to be processed. After capturing the leader block the pantocam arm swings the leader block around an arcuate tape guide and then lodges the leader block in a reel. When the reel is rotated the tape moves adjacent the magnetic head, the magnetic head being located intermediate the tape guide. After the tape is processed, a reel in the cartridge returns the tape to the cartridge and the pantocam arm delivers the leader block to the cartridge, where it is released. The head assembly may now have collected some debris and accumulated a slight charge. It would be desirable if the head assembly could be cleaned and cleared of charge after processing each tape without adding to the cost and complexity of the drive.

SUMMARY OF THE INVENTION

The present invention provides an apparatus which cleans debris and discharges static electricity from a tape head assembly after a tape is processed. This is accomplished without the addition of any extra components to the tape drive. A mechanism, which relies upon existing moving components of the drive, is provided for engaging brush and head assemblies after processing a tape and disengaging the brush and head assemblies before processing a tape. In operation, the brush is brought into engagement with the air bearing surface of the head while the head is oscillated perpendicular to the tape path within the limits of actuator movement of the head assembly. The same control signal path which is employed for servo signals serves to transmit oscillation signals. The oscillation signals can be generated pursuant to a microcode which receives position information of the tape from a tachometer. When the tachometer indicates that the tape and leader block have just left the head assembly, the air bearing surface of the magnetic head is oscillated in engagement with the brush. In the aforementioned 3590 tape drive, an arm which supports the brush has uniquely placed camming surfaces which are engaged by the leader pin; causing the brush to disengage the head assembly just before the tape engages the air bearing surface, and causing the brush to engage the air bearing surface just after the tape disengages the air bearing surface. In this manner the brush engages and disengages the head assembly without the addition of, for example, a motor to the drive. Further, if the arm is in the wrong location, camming surfaces are provided on the arm for correctly repositioning it just before the tape is moved across or away from the air bearing surface. This arrangement obviates the requirement of sensors to sense location of the arm.

Upon engagement of the brush and the air bearing surface, brushing action therebetween is implemented by the existing motive power of the actuator. In slotted head assemblies, the present invention provides a set of bristles opposite each slot so that when oscillation takes place the bristles of each set reach within a respective slot to remove debris. The invention also provides for a mix of small diameter soft bristles and large diameter stiff bristles. The soft bristles reach into the slots for cleaning action while the stiff bristles control the extent of insertion of the soft bristles into the slots as well as minimizing long term matting of the bristles.

At the time of brushing action, provision is also made for discharging any static electricity built up on the head assembly. This is accomplished by providing a circuit path coupling the tips of the bristles in the brush assembly to the frame of the drive. Nylon bristles with carbon cores may be provided so that carbon cores at the tips of the bristles contact the air bearing surface. At the base of the bristles the carbon cores may contact electrically conductive bristle holders. The bristle holders may be mounted on the aforementioned arm which, in turn, is mounted on the frame of the drive. By making the arm electrically conductive to a grounded frame the electrostatic build-up on the magnetic head is relieved each time the bristles come into contact with the magnetic head.

An object of the present invention is to employ existing power components of a magnetic tape drive in an apparatus for cleaning a magnetic head at a predetermined time.

Another object is to rely upon power of an actuator for providing brushing action between a brush and the air bearing surface of a magnetic head assembly.

A further object is to rely upon power of a tape threader for moving a brush into and out of engagement with a magnetic head assembly and upon the power of an actuator for implementing brushing of the head assembly.

Still another object is provide effective brush cleaning of a slotted head assembly.

Still a further object is to move a brush assembly to a correct position into or out of engagement with a magnetic head assembly when the brush assembly is improperly located with respect to the position of the head assembly.

Yet another object is to discharge any electrostatic build-up on a head assembly each time the brush assembly comes into contact with the head assembly.

Yet a further object is to provide various methods of implementing the foregoing objects.

Other objects and the attendant advantages thereof will become apparent upon reading the following description taken together with the following drawings.

BRIEF DESCRIPTION OF THE DRAWING

FIG. 13C is a plan illustration of the lever arm in its nested clockwise disengaged position.

FIG. 14 is an isometric illustration of the brush assembly.

FIG. 15 is a view taken along line 15—15 of FIG. 14.

FIG. 16 is an enlarged cross-section of one of the nylon bristles with a carbon core.

FIG. 17 is a plan view of the terminal ends of the bristles of the brush holder showing a mix thereof.

FIG. 20 is a plan view of the spring for biasing the lever arm.

DETAILED DESCRIPTION OF THE PREFERRED EMBODIMENTS

Figure 1:
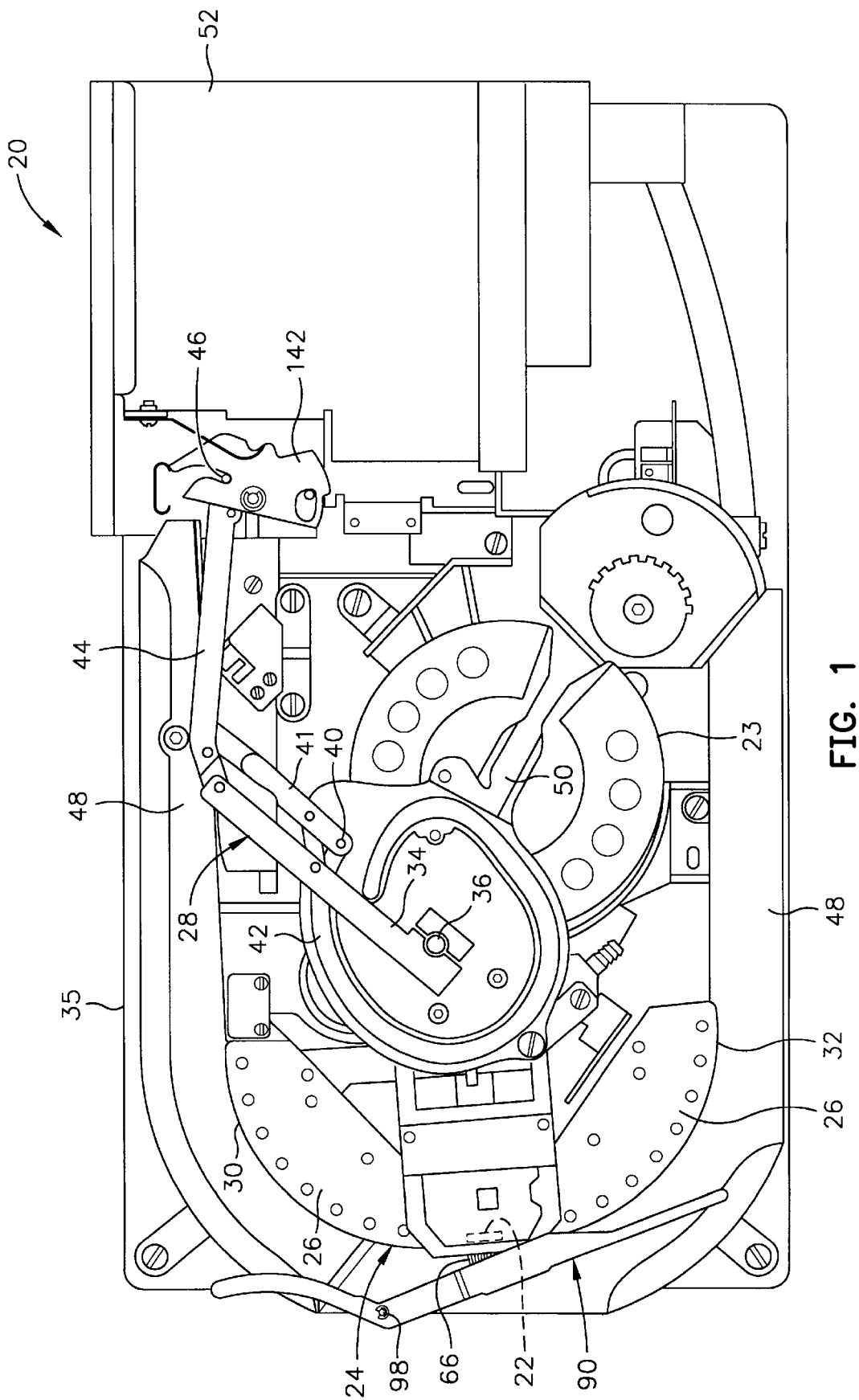
FIG. 1 is a plan view of an exemplary magnetic tape drive with a spindle at its home position for capturing a leader block of a tape cartridge (not shown) and a brush on a lever arm engaging a magnetic head of the drive.

Referring now the drawings wherein like reference numerals designate like or similar parts throughout the several views, there is illustrated in FIG. 1 an exemplary magnetic tape drive 20 which has a magnetic head 22 and a tape reel 23. The drive 20 has a curved tape guide 24 with top and bottom plates for guiding the top and bottom edges of a magnetic tape and a curved plate for guiding the tape across the magnetic head 22, the magnetic head being located at an intermediate location along the tape guide 24. The aforementioned top plate is shown at 26 and the curved plate and the bottom plate are hidden therebelow. Details on this curved guide can be obtained from co-pending commonly assigned patent application, Ser. No. 08/405,418, which is incorporated by reference herein. The tape is moved about the guide 24 in a counterclockwise (upstream or threading) direction, as seen in FIG. 1, by a pantocam arm assembly 28 which will be explained in more detail hereinafter. The magnetic head 22 is generally centrally located along the tape guide 24 so that the tape guide 24 has a first portion 30 downstream from the magnetic head and a second portion 32 which is upstream from the magnetic head.

The pantocam arm includes a plurality of arms which are generally arranged in a parallelogram, with one of these arms 34 being pivoted to a frame 35 of the drive at 36 for rotation with respect thereto. A pin 40 on another one of the arms 41 rides in a track 42 which, when rotated by the arm 34 about the pivot 36, causes a trailing arm 44 to move a leader pin 46 about a track 48 which guides the pin 46 about the curved guide to a slot 50 within the reel 23. When the leader pin 46 traverses this path it takes with it a leader block (see 150 in FIG. 2) connected to a tape (see 152 in FIG. 2)

which is unreeled from a reel of a cartridge (not shown) inserted in a cartridge receptacle 52. The pantocam arm type of magnetic tape drive with a leader pin and a leader block is also described in commonly assigned U.S. Pat. No. 5,379,167 and U.S. Pat. No. 4,334,656 which are incorporated by reference herein.

In the drive shown in FIGS. 1–11 the magnetic head 22 (see FIG. 2) is mounted for vertical movement into and out of the paper by an actuator (see FIG. 19) for accurately positioning the read and write elements of the magnetic head on data tracks on the magnetic tape in response to servo signals. These servo signals are generated by servo read elements on the magnetic head which read off-track conditions and provide signals which can be processed to implement the aforementioned positioning of the read and write heads. The actuator will be described in more detail hereinafter. When a cartridge is inserted within the cartridge receptacle 52, a forward portion of the cartridge exposes a leader block (see 150 of FIG. 2) for engagement with the leader pin 46. The leader block has a slot which receives the leader pin 46. In operation, the cartridge is moved downwardly within the receptacle 52 until an enlarged portion of the leader pin 46 captures a mating portion of the leader block so that the leader pin and the leader block are locked together. The leader pin is then ready for release from its home position to drag the leader block and the attached magnetic tape along the path 48 about the tape guide 24 and across the magnetic head 22. When the leader pin and the leader block are nested within the slot 50 of the reel 23, the reel 23 is rotated to cause the tape to move longitudinally past the magnetic head 24. This unreels the magnetic tape from a reel in the cartridge (not shown). After processing the tape, the reel in the tape cartridge (not shown) is powered in the cartridge receptacle to wind the tape back into the cartridge, after which the pin 46 can be released from the leader block 150.

When the magnetic tape moves about the tape guide 24 past the magnetic head 22, frictional enlargement between the magnetic tape and the curve guide releases media debris from the tape which is especially troublesome to the magnetic head. As shown in FIG. 15, the magnetic head 22 may be provided with slots 60 which are employed for bleeding air as the magnetic tape moves past the magnetic head. When the magnetic tape is moving it carries with it a cushion of air which slightly spaces the magnetic tape from the air bearing surface of the magnetic head which is referred to as the flying height of the magnetic tape. This flying height is controlled by the amount of bleeding caused by the slots 60. Debris generated by the frictional action between the top edge of the tape and the top plate 26 rains down on the magnetic head and into the slots 60. After the debris builds up it may emerge in chunks, which can cause momentary signal dropout as the magnetic tape moves past the head. Further, the media debris may adhere to sensitive read and write elements of the magnetic head causing permanent signal dropout. Accordingly, there is an urgent-felt need in the industry for cleaning the magnetic head periodically to remove the media debris.

As shown in FIGS. 14 and 15, the magnetic head is cleaned by a brush assembly 62 which includes a brush holder 64. Groups of bristles 66 may be secured at their inner ends by respective bristle holders 68, the bristle holders 68 being secured within receptacles within the brush holder 64. If the magnetic head 22 has four slots 60, as shown in FIG. 15, four groups of bristles 66 may be employed with each group being positioned so that the outer ends of the bristles are directed toward a respective slot 60 with some of the bristles inserted therein for cleaning action.

Figure 18:
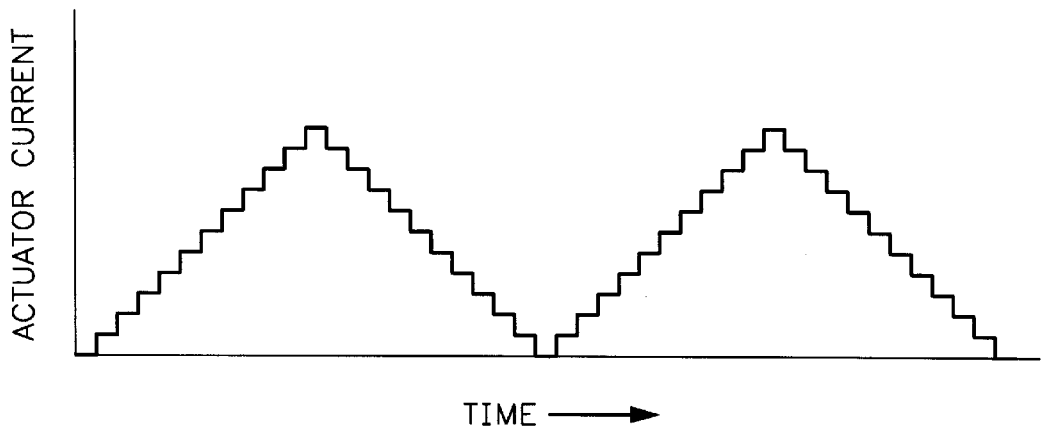
FIG. 18 is an illustration of the current applied to an actuator for oscillating the magnetic head against the brush.
Figure 19:
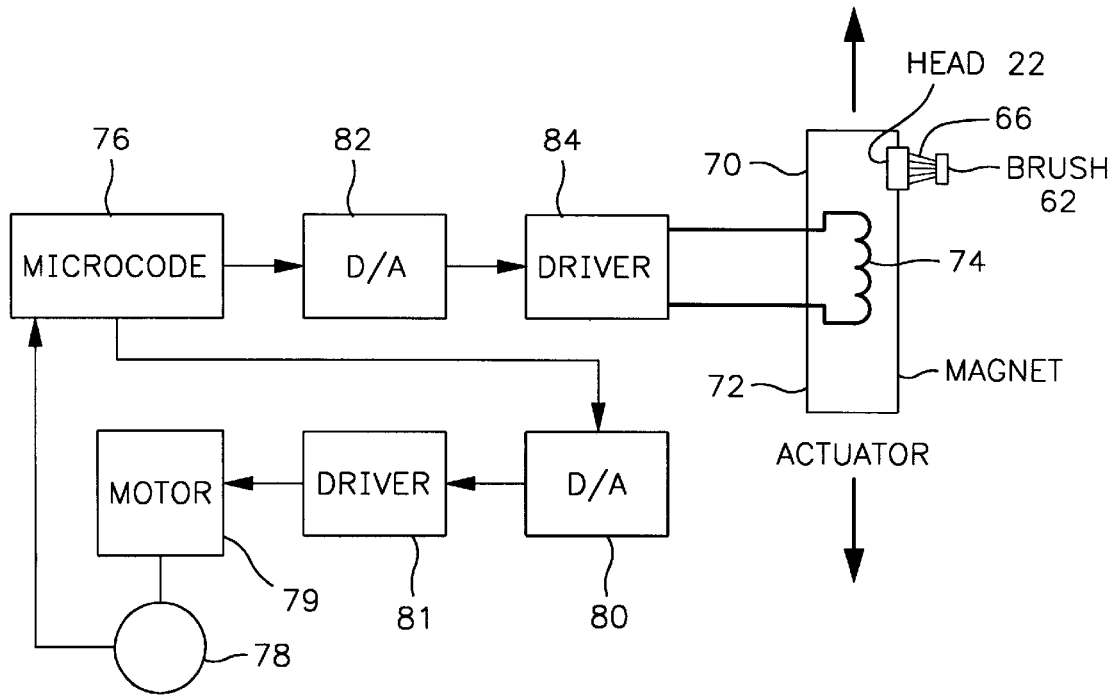
FIG. 19 is a block diagram of the circuitry involved in oscillating the magnetic head.

The aforementioned actuator is shown at 70 in FIG. 19. The actuator includes a magnet 72 which can moved up and down by a coil 74 when it is energized by processing circuitry. The magnetic head 22 is attached to the magnet 72 and rides therewith so that it can be moved up and down adjacent the bristles 66 of the brush assembly 62. During cleaning action of the air bearing surface of the magnetic head the actuator does not serve as an actuator for positioning the magnetic head over tracks on the magnetic tape, but in contrast oscillates rapidly back and forth in an up and down direction as caused by the processing circuitry shown in FIG. 19. The processing circuitry may include microcode 76 which receives positional information of the magnetic tape from a tachometer 78 connected to a motor 79 that drives the reel 23 in the tape drive. The microcode 76 also controls the motor 79 through a D/A converter and a driver 81. The microcode employs the positional information to start and stop the cleaning action of the magnetic head against the brush assembly 62 at appropriate times, which will be described in more detail hereinafter. The microcode provides digital information to a D/A converter 82 which provides an analog signal to a driver 84. The analog signal is fed by the driver 84 to the coil 74 for oscillating the magnet 72 of the actuator in a reciprocatory or oscillatory movement as shown by the up and down arrows in FIG. 19. The current provided to the actuator by the driver 84 is represented by the stepped triangular waveform of FIG. 18, which causes the magnet 72 to oscillate as stated hereinabove.

Figure 12:
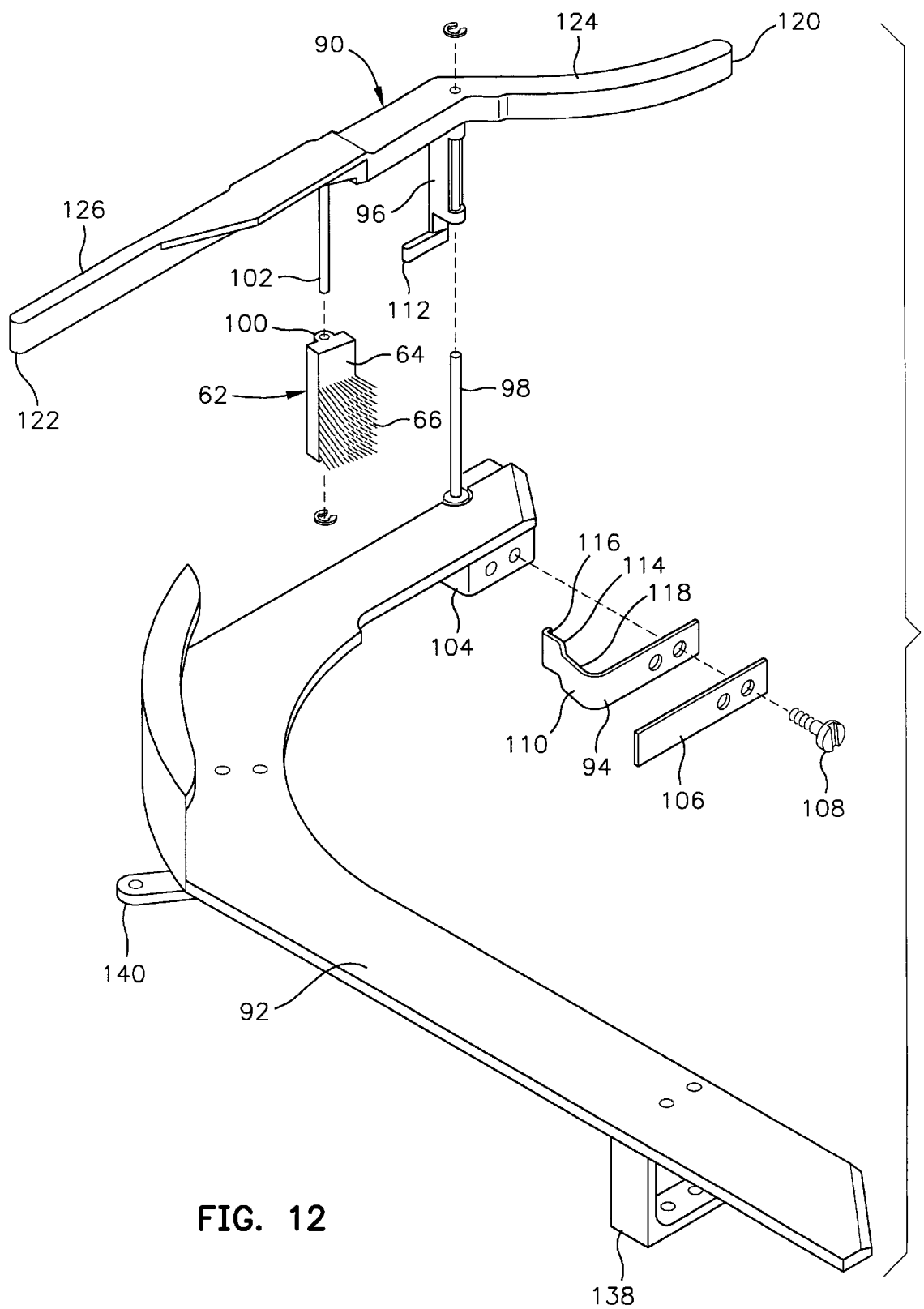
FIG. 12 is an exploded isometric illustration of the lever arm, brush, spring and bracket assembly.

FIG. 12 shows an exploded isometric illustration of the cleaning assembly which includes a lever arm 90, the brush assembly 62, a bracket 92 and a leaf spring 94. The lever arm 90 has a journal 96 which receives an upstanding spindle 98 on the bracket 92 for pivoting the lever arm 90 about the axis of the spindle 98. The brush assembly 62 has a journal 100 which receives a downwardly extending spindle 102 so that the brush assembly can pivot about the spindle 102 within limits dictated by the underside of the lever arm. This pivoting positions the bristles 66 so that they engage the magnetic head straight on rather than at an angle. The spring 94, which is also shown in FIG. 20, is mounted to a flange 104 which extends downwardly from the bracket 92 by a washer 106 and screws 108, only one of the screws being shown in FIG. 12. As shown in FIGS. 12 and 19 the spring 94 has an outwardly extending portion 110 which extends below the bracket 92 so as to engage an arm 112 which is connected to the journal 96 and follows the movements of the lever arm 90. The portion 110 of the spring 94 has a high point 114 with a downwardly sloping brush disengaging position 116 and a downwardly sloping brush engaging region 118. When the device shown in FIG. 12 is fully assembled the arm 112 can be moved to the disengaging or engaging regions 116 or 118 as it is moved across the high point 114. When the end of the arm 112 is pushed just past the high point 114 it snaps to one or the other of the disengaging or engaging regions 116 or 118 causing the lever arm 90 to snap the brush assembly 62 away from the magnetic head or snap the brush assembly 62 into engagement with the magnetic head as will be described in more detail hereinafter.

Figure 2:
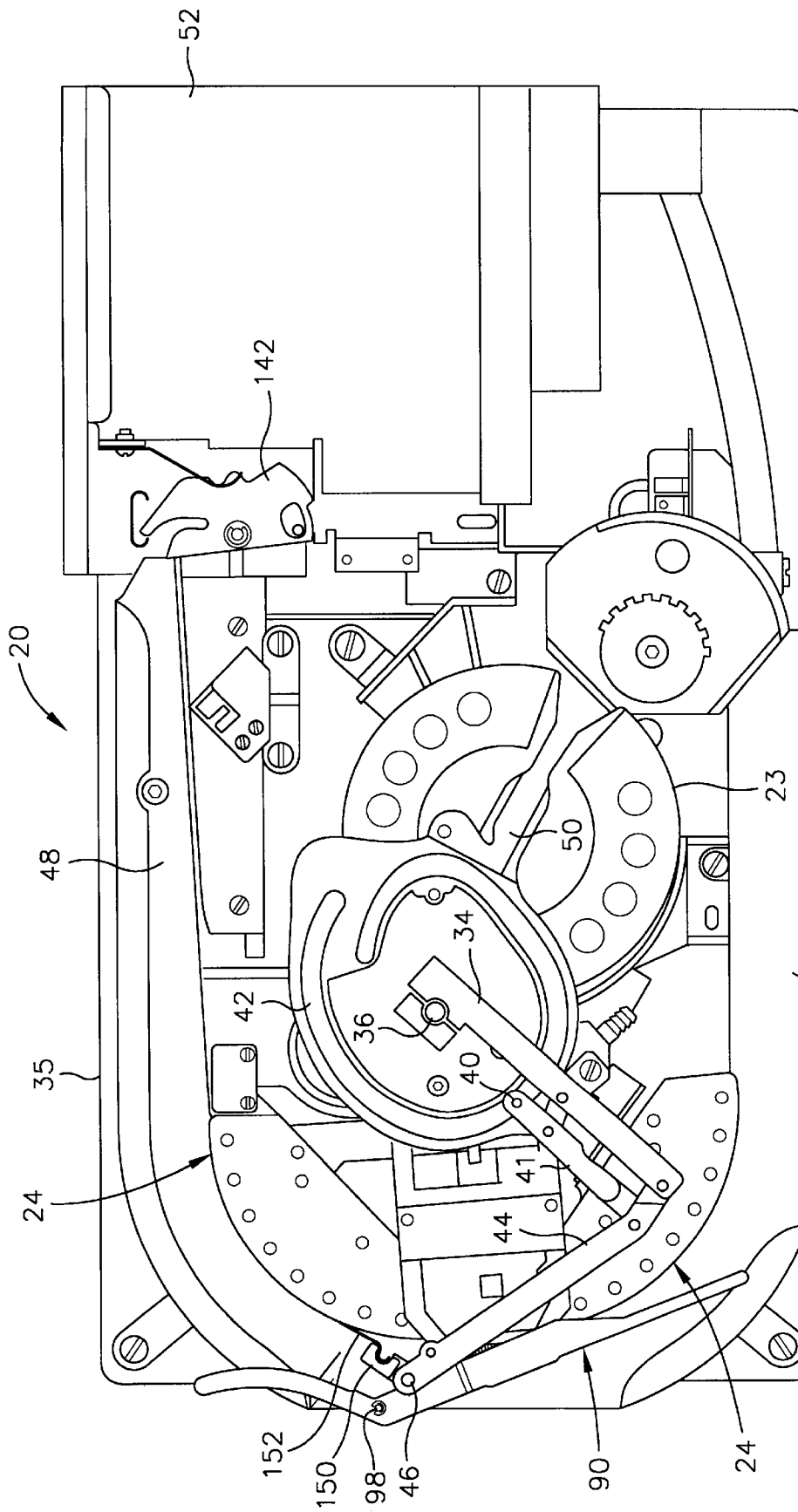
FIG. 2 is the same as FIG. 1 except the leader pin has just engaged the lever arm for moving the brush away from the magnetic head.

As shown in FIG. 12, the lever arm 90 includes a downstream end 120 and an upstream end 122. A first or downstream end portion of the lever arm 124 extends between the end 120 and the spindle 102 for the brush assembly 62. A second or upstream portion 126 of the lever arm extends between the end 122 and the spindle 102 for the brush assembly 62. It should be noted that the first portion 124 of the lever arm 90 is pivotally connected at an intermediate location, namely at spindle 98 between the end 120 and the spindle 102. As will be explained hereinafter, the leader pin 46, which is shown in FIGS. 1 and 2 for capturing the leader block, is employed for engaging the lever arm 90 at various locations to cause the brush assembly 62 to engage or disengage the air bearing surface of the magnetic head at appropriate times so that cleaning action by the brush assembly does not interfere with movement of the magnetic tape across the head. It should be noted that the portion 124 of the lever arm has a curved portion on the downstream side of the journal 96 and a straight portion between the journal and the spindle 102. Further, the upstream portion 126 of the lever arm 90 has an extended straight portion which extends a distance from the spindle 102. These configurations are important for providing appropriate camming surfaces for the leader pin 46 thereby obtaining appropriate engagement and disengagement of the brush assembly 62 with the air bearing surface of the magnetic head.

Figure 13A:
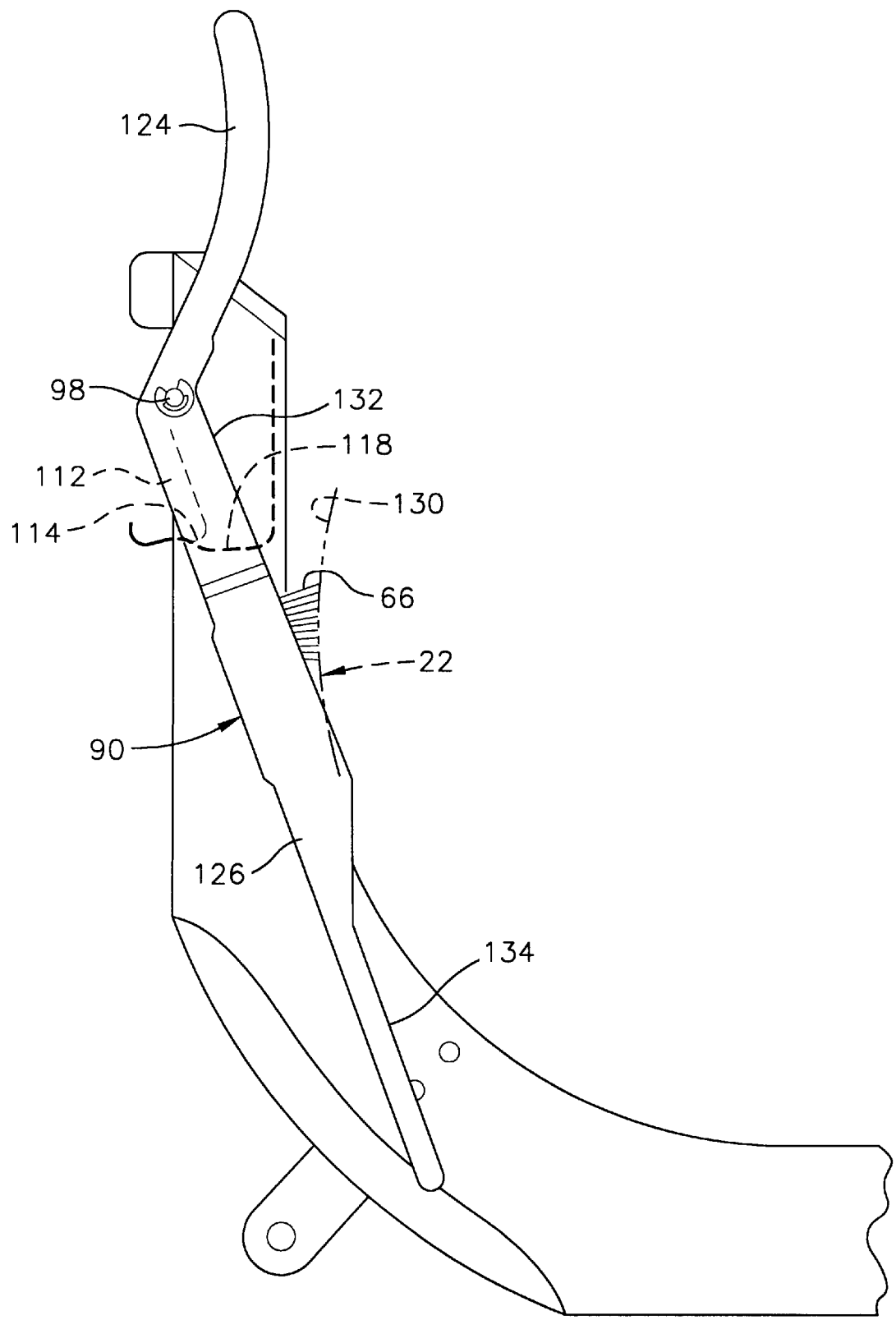
FIG. 13A is a plan illustration of the lever arm in a position where the brush engages the magnetic head.

FIG. 13A illustrates the lever arm 90 in a position where the bristles 66 are engaging the air bearing surface 130 of the magnetic head 22. In this position, it can be seen that the end of the arm 112 is slightly past the high point 114 of the spring into the engaging region 118. In this region the end of the arm 112 is on the down slope so as to cause the bristles 66 to apply a slight pressure on the air bearing surface 130. A camming surface 132 is shown on a straight portion of the arm portion 124 located upstream from the pivot 98 for receiving the leader pin 46, shown in FIG. 1, so as to cause the lever arm 90 to be moved in a clockwise direction to disengage the bristles 66 from the air bearing surface 130. Likewise a camming surface 134 is provided on the arm portion 126 which is engageable with the leader pin 46, shown in FIG. 1 for rotating the lever arm 90 in a clockwise direction to disengage the bristle 66 from the air bearing surface 130.

Figure 13B:
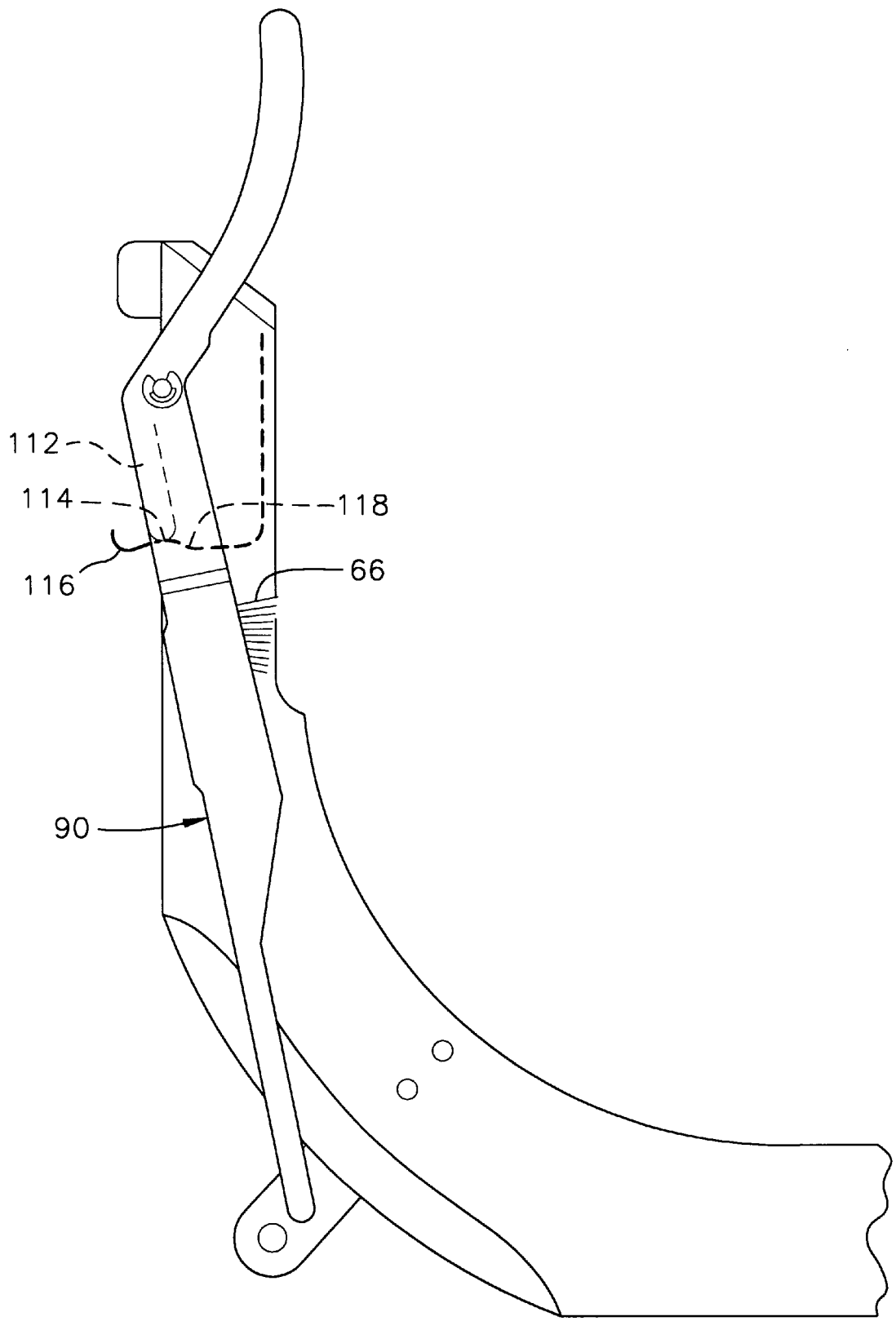
FIG. 13B is a plan illustration of the lever arm at an intermediate position where a slight force either way will cause the lever arm to toggle or snap to positions which are located clockwise or counterclockwise.

FIG. 13B shows the lever arm 90 in an intermediate position where the end of the arm 112 engages the high point 114 of the leaf spring. If the lever arm is rotated slightly clockwise the end of the arm 112 will quickly ride down the slope within the disengaging region 116 causing the lever arm 90 to snap quickly in a clockwise direction to a home position as shown in FIG. 13C. If the lever arm 90 in FIG. 13B is rotated slightly counterclockwise the end of the arm 112 will quickly ride down the slope within the engaging region 118 of the spring causing the bristles 66 to snap into engagement with the air bearing surface 130 as shown in FIG. 13A.

In FIG. 13C the end of the arm 112 is fully nested within the disengaging region 116 of the spring so that the lever arm 90 is positioned with the bristles 66 fully out of the path of the leader pin 46, the leader block and the tape which will be explained in more detail hereinafter. The curved portion of the upstream portion 124 of the lever arm 90 is provided with a camming surface 136 which is engageable with the leader pin 46, shown in FIG. 1, for moving the lever arm counterclockwise to engage the bristles 66 with the air bearing surface 130 of the magnetic head as shown in FIG. 13A.

Figure 3:
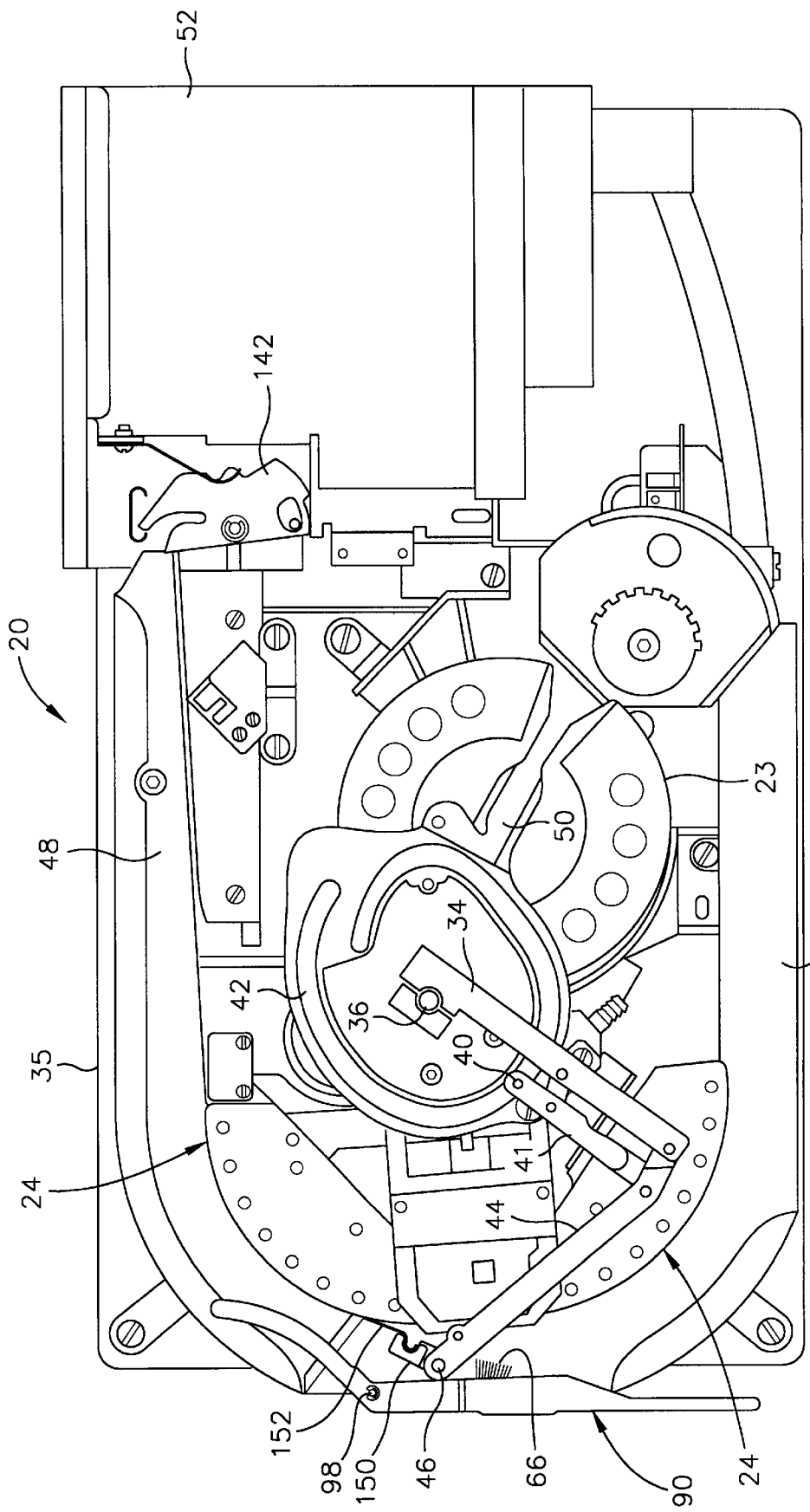
FIG. 3 is the same as FIG. 2 except the leader pin has pushed the lever arm far enough to disengage the brush from the magnetic head.
Figure 4:
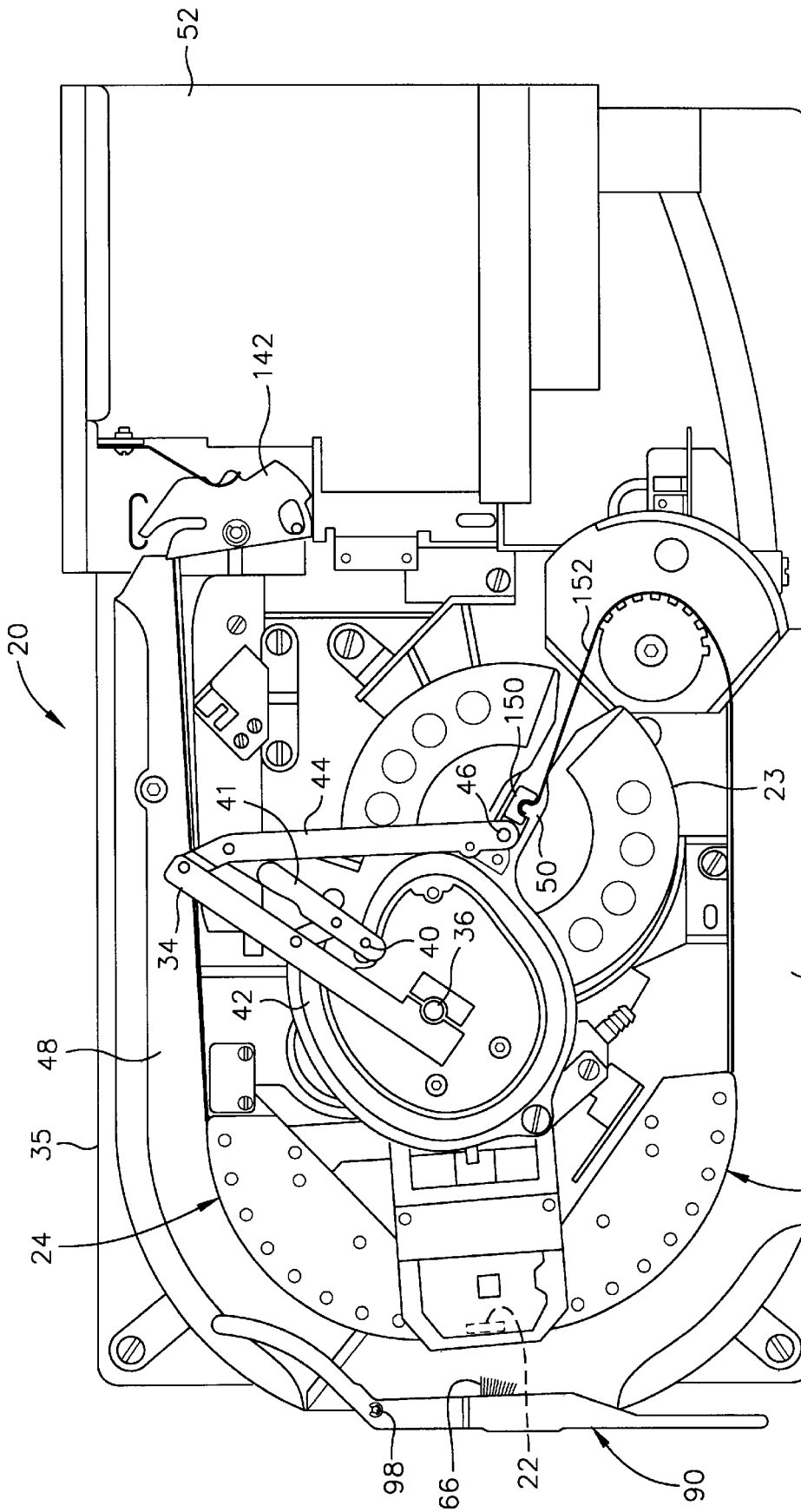
FIG. 4 is the same as FIG. 3 except the leader pin has entered a slot in the reel of the tape drive where the leader block is in a nested position waiting for the reel to be rotated so as to move the magnetic tape past the magnetic head for recording and playback functions.
Figure 5:
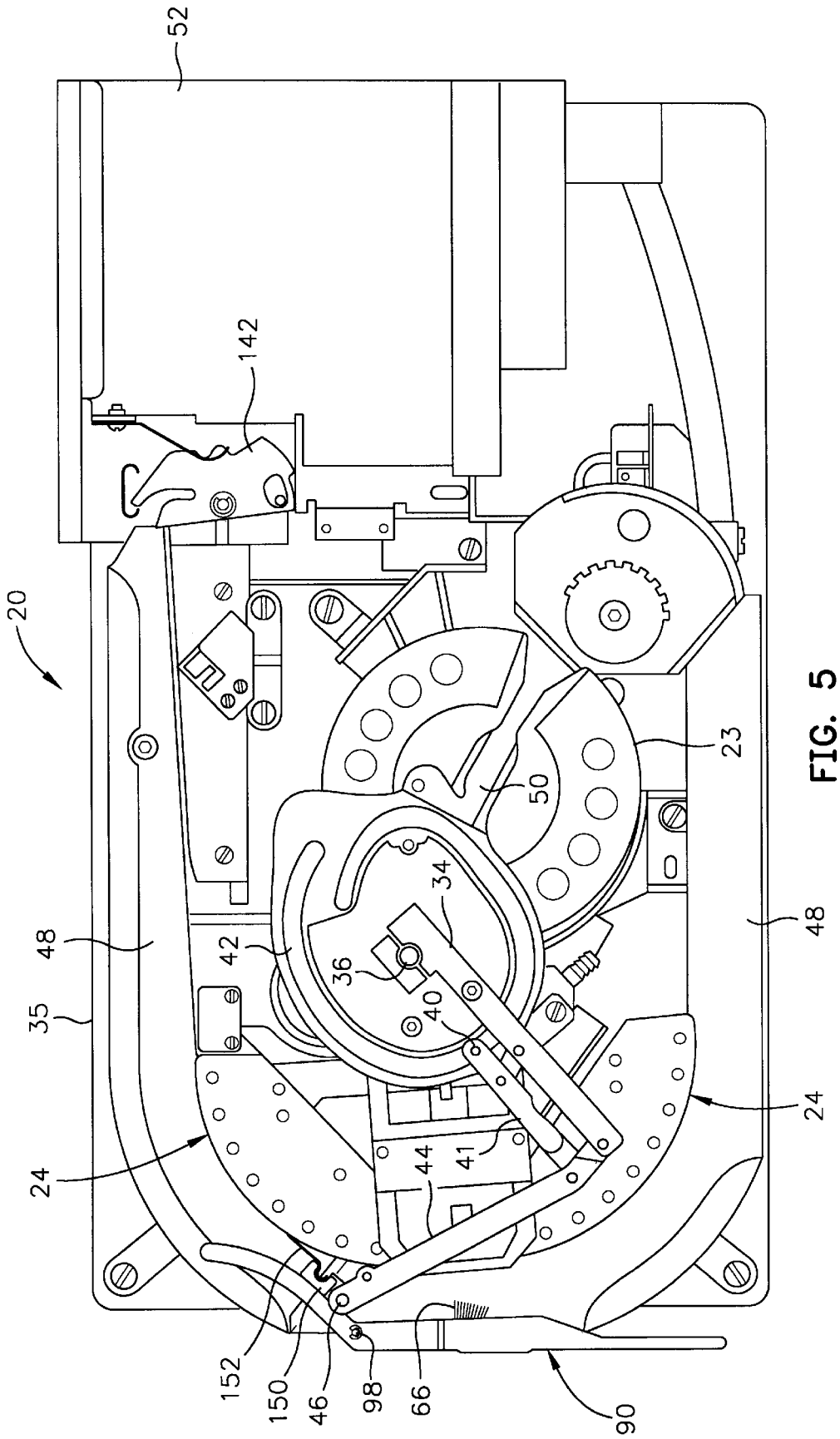
FIG. 5 is the same as FIG. 4 except the leader pin has just engaged the lever arm for engaging the brush with the magnetic head.
Figure 6:
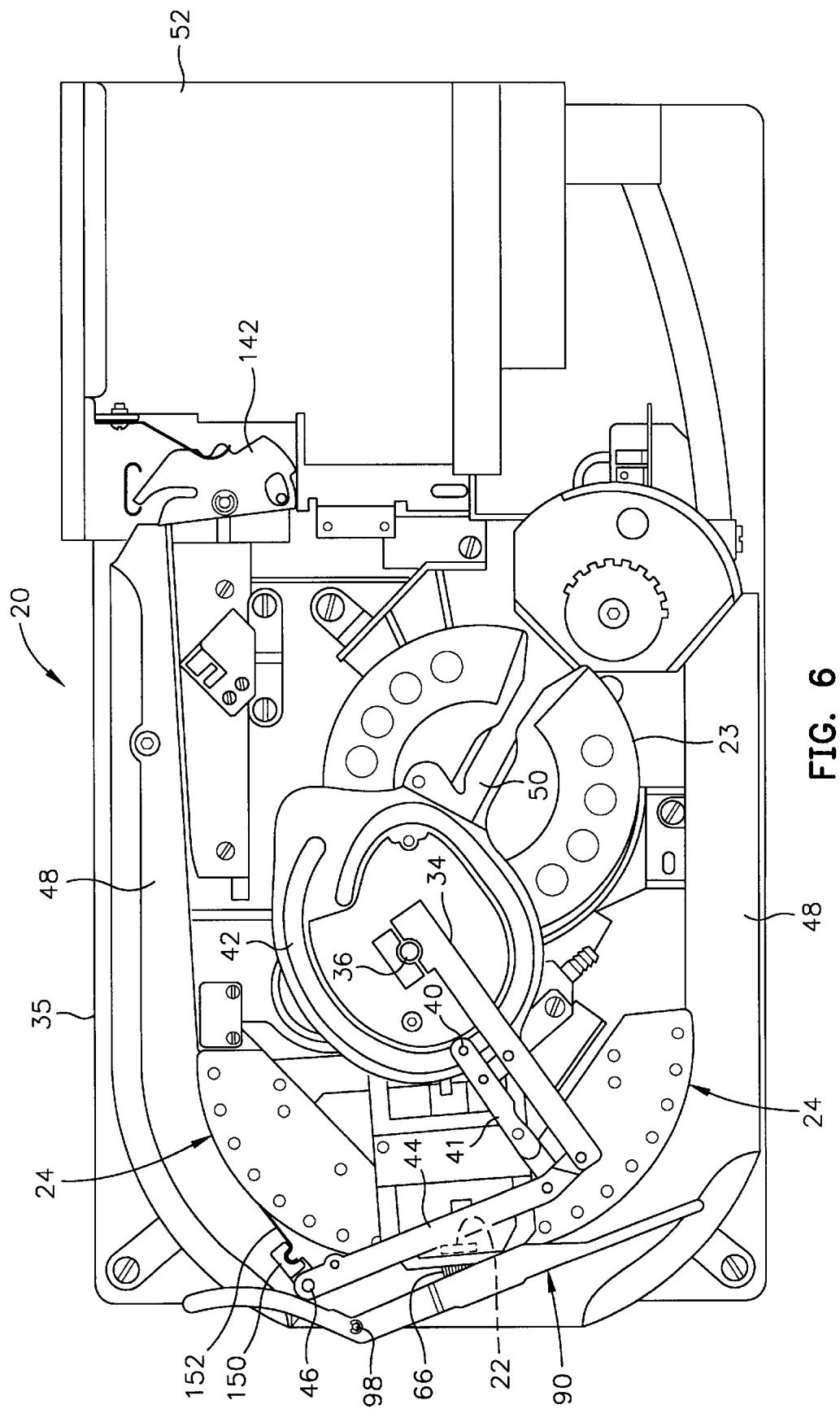
FIG. 6 is the same as FIG. 4 except the leader pin has pushed the lever arm far enough to cause the brush to engage the magnetic head.

As shown in FIG. 12 the bracket 92 is provided with flanges 138 and 140 for connecting the assembly to the tape drive as shown in FIG. 1. In FIG. 1 the tape cartridge (not shown) is inserted within the cartridge holder 52 which engages the leader block 150 with the leader pin 46. This is caused by the cartridge dropping to a downward position causing an enlarged downward portion of the leader pin 46 to mate with an enlarged locking portion within the leader block. Before the leader pin 46 and the leader block leave the home position shown in FIG. 1, the lever arm 90 is pivoted to a position where the bristles 66 engage the magnetic head 22. This is the normal position of the lever arm 90 when the leader pin 46 is at its home position. A slotted release plate 142 pivots from the position shown in FIG. 1 to the position shown in FIG. 2 to release the spindle 46 and the leader block. In FIG. 2 the leader pin 46 is shown pulling the leader block 150 along with the tape 152 about a first portion of the guide just before the leader pin 46 gets to the magnetic head (not shown). In this position the leader pin 46 engages the camming surface 132, shown in FIG. 13A, for moving the lever arm 90 clockwise to disengage the bristles from the air bearing surface 130 of the magnetic head as shown in FIG. 13A. In FIG. 2 the leader pin 46 is just commencing the camming action which rotates the lever arm 90 to the intermediate position shown in FIG. 13B, after which the lever arm 90 snaps quickly clockwise to the position shown in FIG. 3 and FIG. 13C with the bristles 66 disengaged from the magnetic head. As shown in FIG. 3, there is no blockage of the movement of the leader pin 46 and the leader block 150 by the lever arm 90. In FIG. 4 the leader pin 46 continues on its path about the remainder of the tape guide 24 and along the tape path 48 until the leader pin 46 and the leader block 150 arc nested within the slot 50 of the reel 23. The leader pin 46 is at the center of the reel 23 so that when the reel is rotated the tape 152 is moved across the air bearing surface of the magnetic head 22. After the tape is processed the pantocam arm moves the leader pin 46 downstream in the tape path 48 about the tape guide 24, as shown in FIG. 5, until the leader pin engages the camming surface 137 shown in FIG. 13C for moving the lever arm 90 counterclockwise to engage the bristles 66 with the air bearing surface of the magnetic head as shown in FIGS. 6 and 13A. The leader pin 46 then continues its path in the downstream direction in the tape path 48 until it is nested in its home position as shown in FIG. 1.

Figure 7:
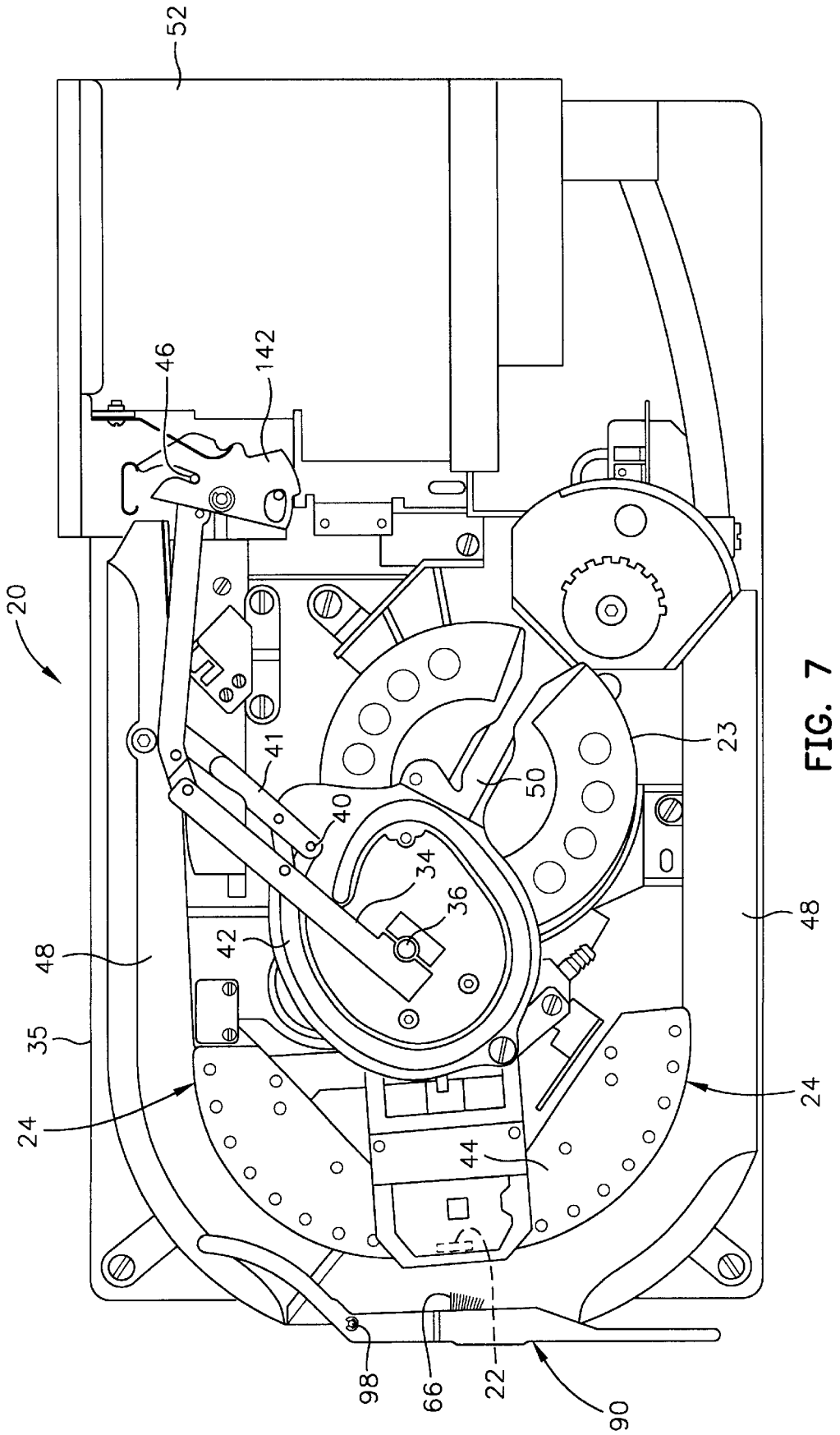
FIG. 7 is the same as FIG. 1 except the lever arm supporting the brush is in an abnormal position.
Figure 8:
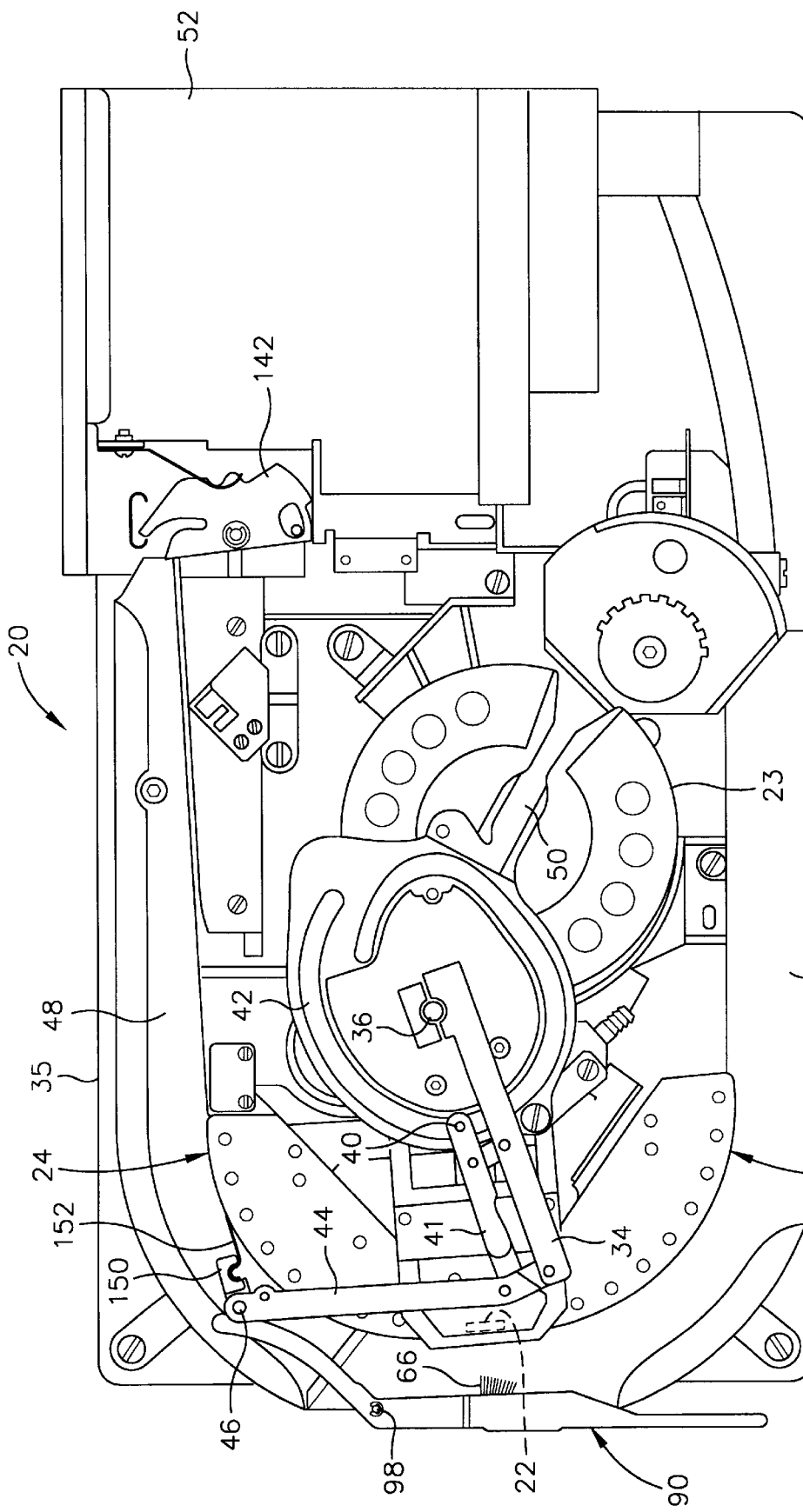
FIG. 8 is the same as FIG. 7 except the leader pin has just engaged the lever arm for moving the brush to a proper position which is in engagement with the magnetic head.
Figure 9:
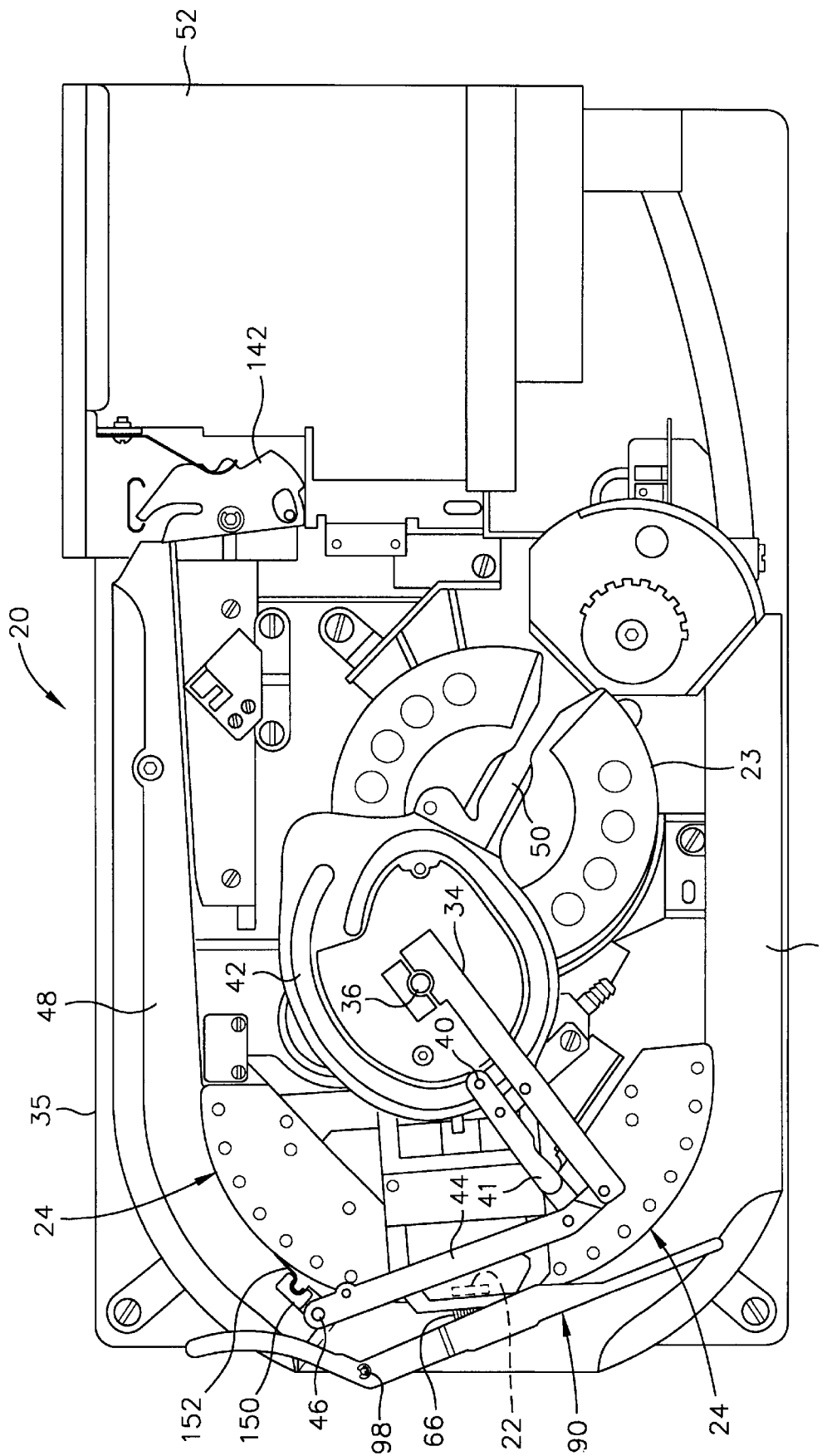
FIG. 9 is the same as FIG. 8 except the leader pin has moved the lever arm to the proper position with the brush engaging the magnetic head.

FIG. 7 shows the lever arm 90 in an abnormal position where the bristles 66 are disengaged from the magnetic head 22 when the leader pin 46 is in its home position. When the leader pin carries the leader block 150 and the tape 152 upstream along the tape path the leader pin 46 engages the camming surface 136 of the lever arm, as shown in FIGS. 13C and 8, causing the lever arm to rotate counterclockwise to engage the bristles 66 with the air bearing surface of the magnetic head as shown in FIGS. 9 and 13A. The lever arm 90 is now in a normal position and the operation of the drive continues with that described hereinabove for FIG. 2.

Figure 10:
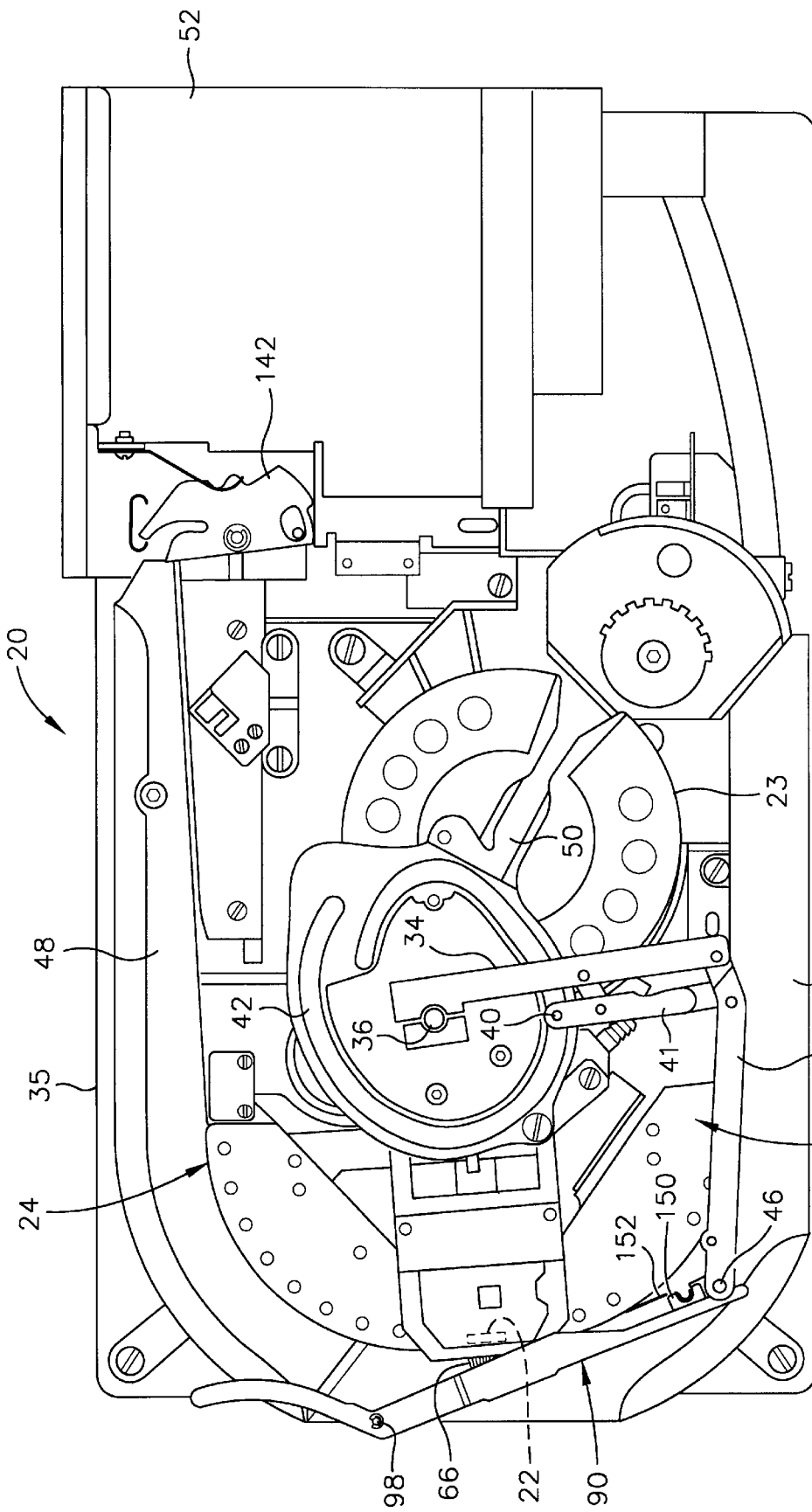
FIG. 10 is the same as FIG. 1 except that the lever arm is in an abnormal position with the brush engaging the magnetic head after the leader pin has left its nested position in the reel and has just engaged an end of the lever arm.
Figure 11:
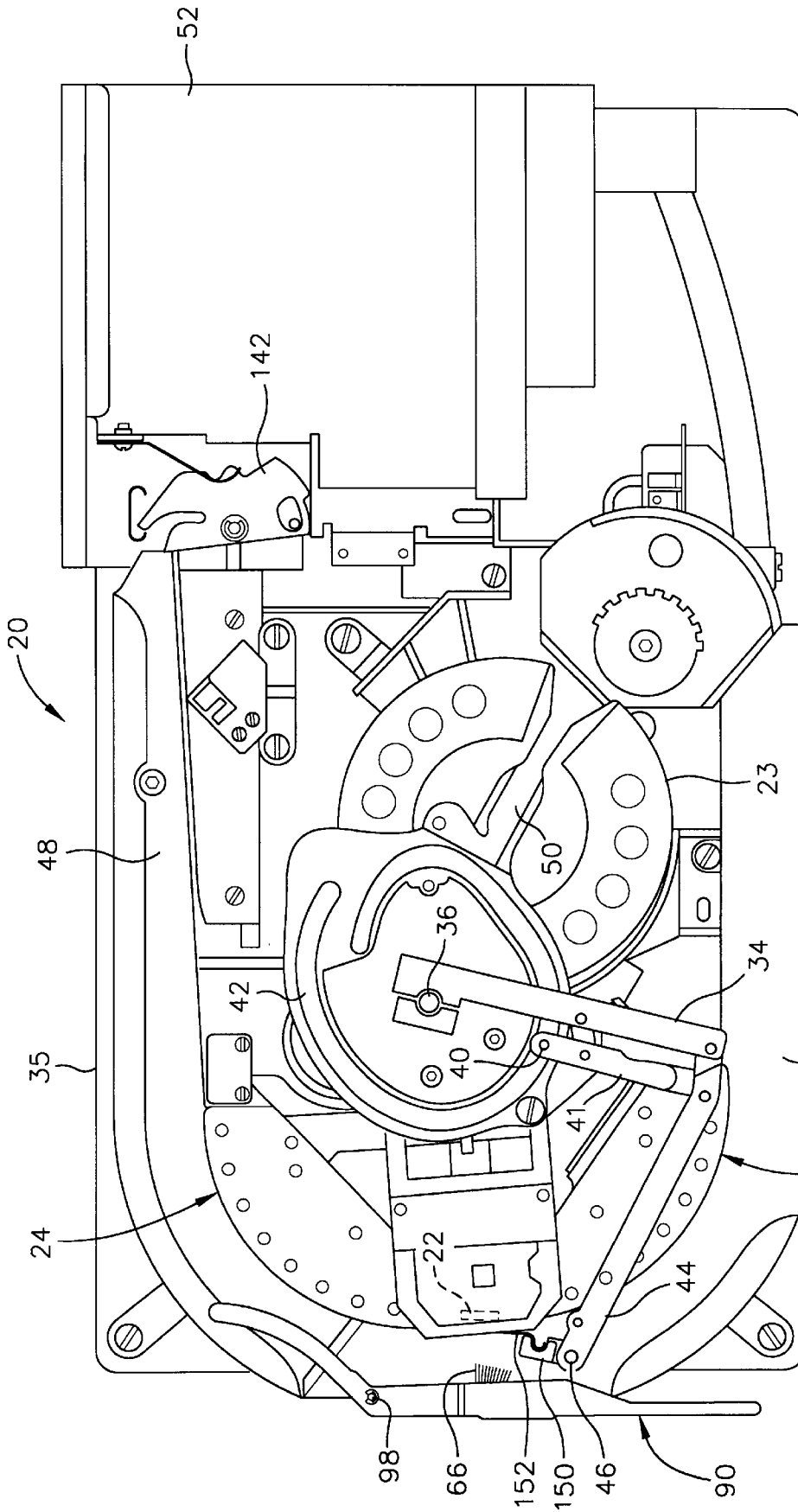
FIG. 11 is the same as FIG. 10 except the leader pin has pushed the lever arm sufficiently to cause the lever arm to assume a proper position where the brush is disengaged from the magnetic head.

FIG. 10 illustrates another abnormal position of the lever arm 90 where the bristles 66 engage the air bearing surface of the magnetic head 22 as shown in FIG. 10 while the leader pin 46 and leader block 150 are being moved in a downstream direction returning to its home position. When this occurs, the leader pin 46 engages the camming surface 134, shown in FIG. 13A, for rotating the lever arm 90 in a clockwise direction to disengage the bristles 66 from the air bearing surface of the magnetic head, as shown in FIG. 11, and allow passage for the leader pin 46 to continue its path to the home position shown in FIG. 1.

The timing of the cleaning action occurs at or just subsequent to the engagement of the bristles 66 with the air bearing surface of the magnetic head 22, as shown in FIG. 6, as the leader pin 46 moves in the downstream direction toward its home position. The time to commence the cleaning operation is sensed by the microcode 76 from the tachometer 78 as shown in FIG. 19. The tachometer knows the position of the leader pin 46 since the length of the tape is known. When this occurs the microcode 76 causes the actuator to oscillate up and down within the limits of the movement of the actuator for servoing thereby moving the air bearing surface of the head 22 up and down against stationary bristles 66 of the brush assembly 62. The amount of time for this brushing action is discretionary and may be four or five seconds but it should not be so long as to cause a delay in processing a tape within the next tape cartridge. The duration of the cleaning action is controlled by the microcode. Accordingly, the air bearing surface of the magnetic head is cleaned after processing each tape. It is important to note that no additional motors are required to implement this cleaning action since the motive power of the existing actuator for servoing is employed for providing the oscillatory movement of the magnetic head against the bristles of the brush assembly. It should be noted from FIG. 15 that this cleaning action will allow the groups of bristles 66 to clean respective slots 60 within the surface of the magnetic head as well as the exterior surface of the head.

It should be noted that the brushing action by the bristles against the air bearing surface of the magnetic head can cause static electricity to build up on the bristles which is detrimental to brushing the particles from the magnetic head. Because of this static charge media debris will tend to adhere to the bristles causing them to clog and be less effective in their cleaning action. In the present invention this problem has been overcome by shorting the static electricity to the frame 35 of the tape drive. FIG. 16 shows a greatly enlarged cross-section of a nylon bristle 66A with a carbon core 160. The carbon core 160 is exposed at each end of the bristle so that an outer end engages the air bearing surface 130 of the magnetic head and the inner end engages the bristle holders 68 shown in FIG. 15. The bristle holders may be made of a conductive material such as aluminum. The brush holder 64, the spindle 102, the lever arm 90, the journal 96, the spindle 98, the bracket 92 and the flanges 138 and 140, shown in FIG. 12, may be constructed of conductive material such as steel for making a complete electrical path all the way from the air bearing surface 130 of the magnetic head to the frame 35 of the tape drive.

FIG. 17 shows a plan view of the terminal ends of the bristles 66 of the brush holder 62. In the preferred embodiment the bristles 66 comprise a mix of the bristles 66A and bristles 66B. The bristles 66B are stiffer than the bristles 66A so as to engage the air bearing surface 130 and/or the bottoms of the slots 60 to control the extent of insertion of the bristles in the slots. In one example the bristles 66A had a diameter of 57 μm and the bristles 66B were made of solid nylon with a diameter of 0.003 inch.

Clearly, other embodiments and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A magnetic tape drive comprising:

a frame;

a magnetic head having an air bearing surface;

first means on the frame for selectively moving the magnetic head along a linear path;

second means mounted on the frame for moving the tape along a tape path from a first location with respect to the air bearing surface, across the air bearing surface, and returning the tape along said tape path to said first location;

a brush assembly for cleaning the air bearing surface;

third means on the frame and responsive to the second means for engaging the brush assembly with the air bearing surface when the tape is at the first location;

fourth means responsive to the third means for activating the first means so as to reciprocally move the air bearing surface while the brush assembly is in engagement with the air bearing surface;

the third means including:

a lever arm having first and second ends;

the brush assembly being mounted on the lever arm intermediate said first and second ends so that the lever arm has a first arm portion between the brush assembly and the first end and the lever arm has a second arm portion between the brush assembly and the second end;

the lever arm being pivotally mounted on the frame for pivotal movement about a vertical axis between a first position engaging the brush assembly with the air bearing surface and a second position disengaging the brush assembly from the air bearing surface, the lever arm having an intermediate position between said first and second positions; and spring means mounted to the frame and in engagement with said lever arm for biasing the arm to said first position when the lever arm is located between the intermediate position and said first position and for biasing the lever arm to said second position when the lever arm is located between the intermediate position and said second position.

2. A magnetic tape drive comprising:

a frame;

a magnetic head having an air bearing surface;

first means on the frame for selectively moving the magnetic head along a linear path;

second means on the frame for moving the tape along a tape path from a first location with respect to the air bearing surface, across the air bearing surface, and returning the tape along said tape path to said first location;

a brush assembly for cleaning the air bearing surface;

third means on the frame and responsive to the second means for engaging the brush assembly with the air bearing surface when the tape is at the first location;

fourth means responsive to the third means for activating the first means so as to reciprocally move the air bearing surface while the brush assembly is in engagement with the air bearing surface;

the second means including:

tape guide means guiding the tape in a curved tape path across the air bearing surface at a location along said curved path;

a pantocam arm which has the leader pin for capturing the leader block, the leader block being connected to the tape;

means rotating the pantocam arm so that the tape is moved in a threading direction along the tape path from a remote location where the tape does not move across the air bearing surface to a location where the tape does move across the air bearing surface and along an unthreading direction which moves the tape toward said remote location;

a lever arm having first and second ends; and the brush assembly being mounted on the lever arm intermediate said first and second ends so that the lever arm has a first arm portion between the brush assembly and the first end and the lever arm has a second arm portion between the brush assembly and the second end;

a normal operation of the drive comprising the brush assembly being engaged with the air bearing surface when the tape is at the first location and being disengaged from the air bearing surface when the tape is moved across the air bearing surface, the third means including:

on the first arm portion, a first camming surface which engages the leader pin for moving the brush assembly out of engagement with the air bearing surface during normal operation, when the tape is being threaded; and on the first arm portion, a second camming surface which engages the leader pin for moving the brush assembly into engagement with the air bearing surface during normal operation, when the tape is being unthreaded;

an abnormal operation of the drive comprising the brush assembly being disengaged from the air bearing surface when the tape is remotely located from the air bearing surface and being engaged with the air bearing surface when the tape is moving across the head, the third means further including:

the leader pin engaging the second camming surface of the first arm portion for moving the brush assembly into engagement with the air bearing surface and then engaging the first camming surface of the first arm portion for moving the brush assembly out of engagement with the air bearing surface during abnormal operation, when the tape is being threaded; and the second arm portion having a third camming surface which engages the leader pin for moving the brush assembly out of engagement with the air bearing surface during abnormal operation, when the tape is being unthreaded.

3. A tape drive as claimed in claim 2 wherein:

the first arm portion being pivoted to the frame at a location intermediate the first end of the arm and the brush assembly; and during threading, the tape passing the first arm portion before the tape passes the second arm portion.

4. A tape drive as claimed in claim 3 wherein the third means further includes:

the lever arm being pivotally mounted on the frame for pivotal movement about a vertical axis between a first position engaging the brush assembly with the air bearing surface and a second position disengaging the brush assembly from the air bearing surface, the lever arm having an intermediate position between said first and second positions;

spring means mounted to the frame and in engagement with said lever arm for biasing the arm to said first position when the lever arm is located between the intermediate position and said first position and for biasing the lever arm to said second position when the lever arm is located between the intermediate position and said second position.

5. A magnetic tape drive comprising:

a frame;

a magnetic head having an air bearing surface;

first means on the frame for selectively moving the magnetic head along a linear path;

second means on the frame for moving the tape along a tape path from a first location with respect to the air bearing surface, across the air bearing surface, and returning the tape along said tape path to said first location;

a brush assembly for cleaning the air bearing surface;

third means on the frame and responsive to the second means for engaging the brush assembly with the air bearing surface when the tape is at the first location;

fourth means responsive to the third means for activating the first means so as to reciprocally move the air bearing surface while the brush assembly is in engagement with the air bearing surface;

the first means being an actuator;

the actuator being connected to the head and moveable within a range of movements in response to servo signals for tracking the head assembly with respect to one or more tracks on the tape;

the third means including:

a lever arm having first and second ends;

the brush assembly being mounted on the lever arm intermediate said first and second ends so that the lever arm has a first arm portion between the brush assembly and the first end and the lever arm has a second arm portion between the brush assembly and the second end;

the lever arm being pivotally mounted on the frame for pivotal movement about a vertical axis between a first position engaging the brush assembly with the air bearing surface and a second position disengaging the brush assembly from the air bearing surface, the lever arm having an intermediate position between said first and second positions; and spring means mounted to the frame and in engagement with said lever arm for biasing the arm to said first position when the lever arm is located between the intermediate position and said first position and for biasing the lever arm to said second position when the lever arm is located between the intermediate position and said second position.

6. A tape drive as claimed in claim 5 including:

the third means mounting the brush assembly for limited pivotal movement about another vertical axis.

7. A tape drive as claimed in claim 6 wherein the second means includes:

tape guide means guiding the tape in a curved tape path across the air bearing surface at a location along said curved path;

a pantocam arm which has a leader pin for capturing a leader block, the leader block being connected to the tape; and means rotating the pantocam arm so that the tape is moved in a threading direction along the tape path from the first location, where the tape does not move across the air bearing surface, to a second location, where the tape moves across the air bearing surface and along an unthreading direction which moves the tape toward said first location.

8. A tape drive as claimed in claim 7 wherein a normal operation of the drive comprises the brush assembly being engaged with the air bearing surface when the tape is remotely located with respect to the air bearing surface and being disengaged from the air bearing surface when the tape is moved across the air bearing surface, the third means including:

on the first arm portion, a first camming surface which engages the leader pin for moving the brush assembly out of engagement with the air bearing surface during normal operation and when the tape is being threaded; and on the first arm portion, a second camming surface which engages the leader pin for moving the brush assembly into engagement with the air bearing surface during normal operation and when the tape is being unthreaded.

9. A tape drive as claimed in claim 8 wherein an abnormal operation of the drive comprising the brush assembly being disengaged from the air bearing surface when the tape is remotely located from the air bearing surface and being engaged with the air bearing surface when the tape is moving across the head assembly, the third means further including:

the leader pin engaging the second camming surface of the first arm portion for moving the brush assembly into engagement with the air bearing surface and then engaging the first camming surface of the first arm portion for moving the brush assembly out of engagement with the air bearing surface during abnormal operation, when the tape is being threaded; and the second arm portion having a third camming surface which engages the leader pin for moving the brush assembly out of engagement with the air bearing surface during abnormal operation and when the tape is being unthreaded.

10. A tape drive as claimed in claim 9 wherein:

the first arm portion being pivoted to the frame at a location intermediate the first end of the arm and the brush assembly; and during threading the tape passing the first arm portion before the tape passes the second arm portion.

11. A tape drive as claimed in claim 10 including:

said head assembly having a plurality of vertically oriented side-by-side slots in the air bearing surface; and the brush assembly having groups of bristles, each group of bristles being bound by a respective bristle holder with the bristles of each group of bristles extending substantially directly toward the air bearing surface; and each group of bristles being located adjacent to and extending into a respective slot of said side-by-side slots when the brush assembly engages the air bearing surface.

12. A tape drive as claimed in claim 11 including:

each group of bristles comprising a plurality of first bristles and a plurality of second bristles; and the second bristles being more stiff than the first bristles, whereby the second bristles control the extent of insertion of the first bristles into a respective slot of said side-by-side slots and long term matting of each group of bristles.

13. A tape drive as claimed in claim 12 including:

said bristles of each group of bristles being resin bristles with a carbon core;

said holders being electrically conductive;

the carbon cores being electrically connected to the holders; and the holders being electrically connected to said frame.

14. A tape drive as claimed in claim 13 including:

the bristles of each group of bristles having terminal ends opposite said holders; and said terminal ends being collectively shaped to conform to a shape of said air bearing surface.

15. A tape drive as claimed in claim 14 including:

the movement of the air bearing surface being vertical.

16. A magnetic tape drive comprising:

a frame;

a magnetic head having an air bearing surface;

first means mounted on the frame, which upon activation, selectively moves the magnetic head along a linear path;

second means, including a leader pin for engaging a leader block connected to the tape, mounted on the frame for moving the tape along a tape path from a first location with respect to the air bearing surface, across the air bearing surface, and returning the tape along said tape path to said first location;

a brush assembly for cleaning the air bearing surface;

third means on the frame and responsive to the second means for engaging the brush assembly with the air bearing surface when the tape is at the first location;

fourth means responsive to the third means for activating the first means so as to reciprocally move the air bearing surface while the brush assembly is in engagement with the air bearing surface; and the second means further including:

tape guide means guiding the tape in a curved tape path across the air bearing surface at a location along said curved path;

a pantocam arm which has the leader pin for capturing the leader block, the leader block being connected to the tape;

means rotating the pantocam arm so that the tape is moved in a threading direction along the tape path from a remote location where the tape does not move across the air bearing surface to a location where the tape does move across the air bearing surface and along an unthreading direction which moves the tape toward said remote location;

a lever arm having first and second ends; and the brush assembly being mounted on the lever arm intermediate said first and second ends so that the lever arm has a first arm portion between the brush assembly and the first end and the lever arm has a second arm portion between the brush assembly and the second end.

17. A tape drive as claimed in claim 16 wherein a normal operation of the drive comprising the brush assembly being engaged with the air bearing surface when the tape is at the first location and being disengaged from the air bearing surface when the tape is moved across the air bearing surface, the third means including:

on the first arm portion, a first camming surface which engages the leader pin for moving the brush assembly out of engagement with the air bearing surface during normal operation, when the tape is being threaded; and on the first arm portion, a second camming surface which engages the leader pin for moving the brush assembly into engagement with the air bearing surface during normal operation, when the tape is being unthreaded.

* * * * *